United States Patent [19]

Okano

[11] Patent Number: 5,112,080
[45] Date of Patent: May 12, 1992

[54] SENSOR CONTROL CIRCUIT
[75] Inventor: Masami Okano, Saitama, Japan
[73] Assignee: Zexel Corporation, Tokyo, Japan
[21] Appl. No.: 612,913
[22] Filed: Nov. 14, 1990
[30] Foreign Application Priority Data
Nov. 14, 1989 [JP] Japan .................................. 1-295729
[51] Int. Cl.⁵ .............................................. B60R 21/32
[52] U.S. Cl. .................................... 280/735; 180/282;
307/10.1; 340/436
[58] Field of Search ................. 280/734, 735; 180/282;
307/10.1; 340/436

[56] References Cited

U.S. PATENT DOCUMENTS

| | | | |
|---|---|---|---|
| 3,889,232 | 6/1975 | Bell | 280/735 |
| 4,166,641 | 9/1979 | Okada et al. | 280/735 |
| 4,641,041 | 2/1987 | Mattes et al. | 180/282 |
| 4,695,075 | 9/1987 | Kamiji et al. | 280/735 |
| 4,851,705 | 7/1989 | Musser et al. | 180/282 |
| 4,958,851 | 9/1990 | Behr et al. | 180/282 |

Primary Examiner—Kenneth R. Rice
Attorney, Agent, or Firm—Kanesaka & Takeuchi

[57] ABSTRACT

A sensor control circuit which includes a first sensor for detecting an event; a second sensor having identical characteristics with those of the first sensor for detecting the event at the same time; a processing unit having a first processing section for receiving and processing a first sensor signal from the first sensor and a second processing section for receiving and processing a second sensor signal from the second sensor; a first switching unit for switching in response to a first output from the first processing section; a second switching unit for switching in response to a second output from the second processing section; the first and second processing sections being made so as to turn on the first switching unit prior to the second switching unit in response to the first and second sensor signals; and a monitor unit for preventing current conduction to a load if the second switching unit is turned on prior to the first switching unit.

10 Claims, 2 Drawing Sheets

/ 1

SENSOR CONTROL CIRCUIT

BACKGROUND OF THE INVENTION

1. Field of the Invention

The present invention relates to sensor control circuits suitable for airbag devices.

2. Description of the Prior Art

While the number of passengers suffering injuries from automobile collision increases with the increasing use of vehicles, airbag devices have been put into practice which are mounted on the steering wheel or instrument panel to instantly inflate the airbag upon collision to prevent the passenger from crashing against the steering wheel or windshield glass. The airbag devices are composed of an airbag, an actuator, and a sensor control circuit.

The actuator is composed mainly of a heater which quickly converts electric current into heat and an explosive which is blown up by the heat to ignite a gas producing material. The produced gases instantly inflate the airbag.

The sensor control circuit is composed of a sensor for detecting the acceleration of a vehicle, a processing unit for determining whether the acceleration exceeds the threshold value because of a rapid deceleration resulting from a collision or urgent braking, and a switching unit driven by an emergency signal outputted from the processing unit when the acceleration exceeds the threshold value to conduct current to the heater of the actuator.

The processing unit is composed of a processing device such as a microcomputer. In order to increase the reliability of airbag devices, there are provided a pair of systems each consisting of the sensor and processing section. In addition, a pair of switching sections are provided across the heater so that only when both of the detecting systems detect an abrupt stop, both of the switching sections are turned on to energize the heater. In this way, the heater is prevented from being energized by a malfunction of the detecting systems.

However, the processing unit composed of a microcomputer, for example, can be runaway because of disturbance noise. When this happens, even if the sensors do not detect any abrupt stop, both of the switching sections can be turned on by the runaway processing unit to conduct current to the heater. Consequently, the explosive is blown up to cause the gas producing material to produce gases, which instantly inflate the airbag. As a result, the airbag blocks the passenger's view, creating a very dangerous driving condition. In addition, the blown airbag is wasted.

SUMMARY OF THE INVENTION

Accordingly, it is an object of the invention to provide a sensor control circuit with an anti-runaway measure.

According to the invention there is provided a sensor control circuit with an anti-runaway measure, which includes a first sensor for detecting an event; a second sensor having identical characteristics with those of the first sensor for detecting the event at the same time; a processing unit having a first processing section for receiving and processing a first sensor signal from the first sensor and a second processing section for receiving and processing a second sensor signal from the second sensor; a first switching unit for switching in response to a first output from the first processing section; a second switching unit for switching in response to a second output from the second processing section; the first and second processing sections being made so as to turn on the first switching unit prior to the second switching unit in response to the first and second sensor signals; and a monitor unit for preventing current conduction to a load if the second switching unit is turned on prior to the first switching unit.

The above and other objects, features, and advantages of the invention will become more apparent from the following description when taken in conjunction with the accompanying drawings.

DESCRIPTION OF THE PREFERRED EMBODIMENT

Figure 1:
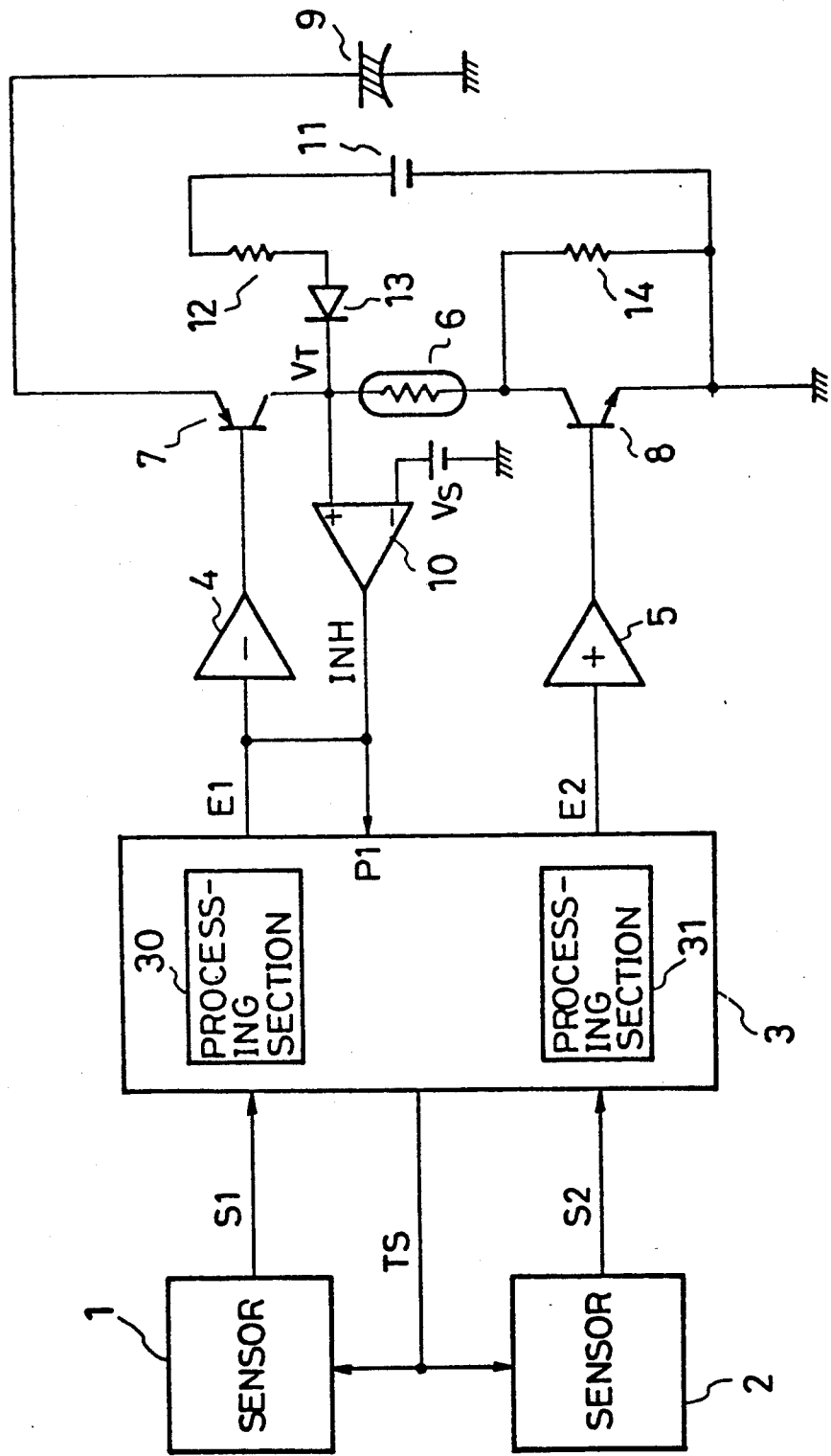
FIG. 1 is a block diagram of a sensor control circuit with anti-runaway measure for use in an airbag device according to an embodiment of the invention.

In FIG. 1, the sensor control circuit includes a pair of sensors 1 and 2 for detecting the acceleration of a vehicle; a processing unit 3, such as microcomputer, having a pair of processing sections 30 and 31 for processing the sensor signals S1 and S2 from the sensors 1 and 2; and a pair of amplifiers 4 and 5 for amplifying the emergency signals E1 and E2 from the processing sections 30 and 31. It is noted that the amplifier 4 is of the inversion type.

The sensor control circuit also includes a pair of switching transistors 7 and 8, the collectors of which are connected across a heater 6 of the actuator for controlling the current through the heater 6. The bases of the pnp transistor 7 and the npn transistor 8 are connected to the outputs of the amplifiers 4 and 5, respectively. Their emitters are connected to a capacitor 9 of large capacitance as an energy reservoir and the ground, respectively.

A comparator 10 of the sensor control circuit compares the voltage $V_T$ at the positive terminal of the heater 6 with the standard voltage $V_S$ and, when $V_T < V_S$, outputs an inhibition signal INH for inhibiting the conduction of a current to the heater 6. A controlled power source 11 outputs a voltage +5 V which is applied to the positive terminal of the heater 6 via a series circuit of a resistor 12 and a diode 13. A resistor 14 connected across the collector-emitter of the transistor 8 cooperate with resistor 12 to provide the controlled voltage $V_T$ which is slightly lower than the voltage at which the heater 6 starts to generate heat.

$$V_T = (5 - D_F)(R2 + R3)/(R1 + R2 + R3)$$

wherein $D_F$ = the forward voltage drop of the diode 13,
$R1$ = the resistance of the resistor 12,
$R2$ = the resistance of the heater 6, and
$R3$ = the resistance of the resistor 14.

The sensors 1 and 2 are designed so that it is possible to check their detecting function by applying a test signal TS from the processing unit 3.

Figure 2:
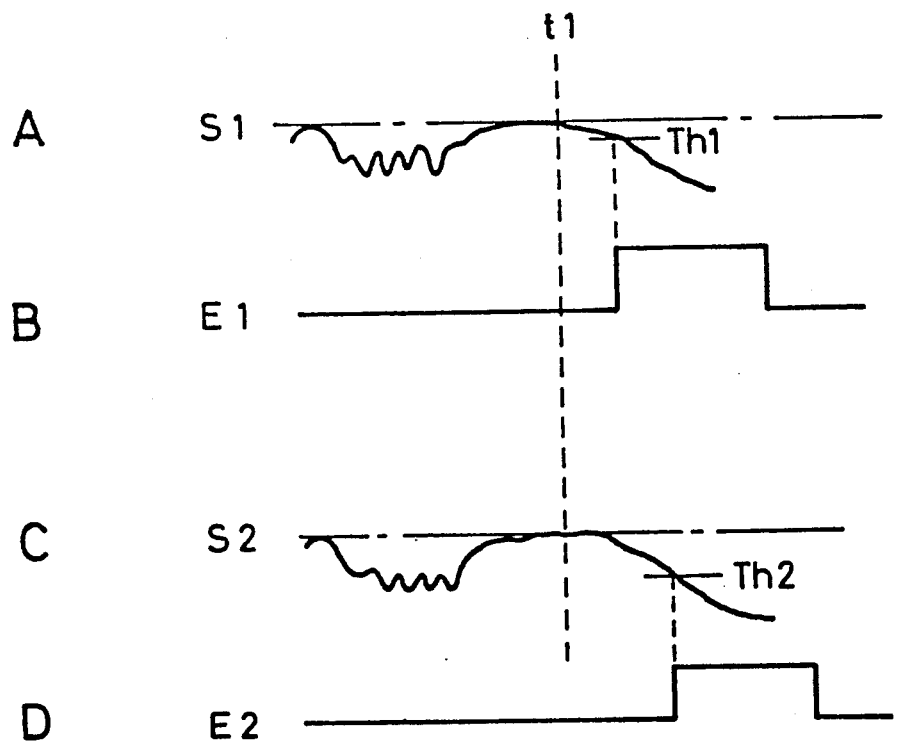
FIG. 2 is a graph showing the relationship between the sensor signal and the threshold value.

The sensor signals S1 and S2 from the sensors 1 and 2 vary with the time as shown by curves A and C of FIG. 2. When there is a collision or urgent braking at a time t1, for example, the vehicle speed drops rapidly so that the amplitudes of the sensor signals S1 and S2 fall steeply.

The processing sections 30 and 31 receive the respective sensor signals S1 and S2 and perform an integration process for eliminating disturbance noise, etc. Then, they perform a comparison process to determine whether the amplitudes of the processed signals exceed the threshold values Th1 and Th2, respectively. That is, they determine whether the amplitudes of the integrated signals S1 and S2 are lower than the threshold values Th1 and Th2, respectively. If S1<Th1 and S2<Th2, the processing sections 30 and 31 output emergency signals E1 and E2 to turn on the transistors 7 and 8, respectively. In order to prevent the processing sections 30 and 31 from inflating the airbag by mistake, the emergency signals E1 and E2 are prioritized; that is, the threshold values Th1 and Th2 are set such that Th1<Th2. Then, if there is an abrupt stop, the emergency signal E1 is first outputted from the processing section 30 and, a little later, an emergency signal E2 is outputted from the processing section 31 as shown in FIG. 2. That is, the emergency signals E1 and E2 are prioritized in output order by differentiating the threshold values Th1 and Th2.

The emergency signals E1 and E2 thus outputted are amplified by the amplifiers 4 and 5 and applied to the bases of the transistors 7 and 8, respectively, turning these transistors on. More specifically, the transistor 7 is turned on first and, slightly later, the transistor 8 is turned on. This permits the energy reservoir 9 to supply power to the heater 6, which generates heat. The generated heat blows up the explosive to permits a gas producing material to produce gases, which instantly inflate the airbag.

Since the transistor 7 is turned on first, the controlled voltage $V_T$ at the positive terminal of the heater 6 is never lower than the standard voltage $V_S$. Consequently, the output of the comparator 10 remains at "H" level so that the inhibit signal INH is insignificant.

If the processing section 30 and/or 31 is out of order and outputs an emergency signal E2 prior to E1, the transistor 8 is turned on first. Consequently, the controlled voltage $V_T$ at the positive terminal of the heater 6 is lower than the standard voltage $V_S$ before the transistor 7 is turned on. It follows that the output signal INH of the comparator 10 changes from "H" level to "L" level so that the inhibition signal INH becomes significant.

When the inhibition signal INH is inputted to the amplifier 4, the base potential of the transistor 7 is held at "H" level, preventing the transistor 7 from being turned on. Consequently, the current to the heater 6 is interrupted before the heater 6 blows the explosive, thereby preventing the airbag from being blown by mistake. In addition, the power stored in the energy reservoir is saved. The inhibition signal INH at "L" level is read into the processing unit 3 via a detection port P1 to record the malfunction.

If the positive terminal of the heater 6 is grounded because of a collision, the comparator 10 prevents discharge of the energy reservoir 9, thereby eliminating the possibility that the engine control unit fails to record the conditions of the collision because of total consumption of the energy in the energy reservoir 9.

Although the controlled voltage $V_T$ at the positive terminal of the heater 6 may be inputted to the processing unit 3 via an AD converter so that the abnormal controlled voltage $V_T$ is detected through a comparing process by software, it is preferred to use the comparator 10 as described above because the AD conversion and comparing process can be incomplete before the explosive is blown up or large amounts of energy are lost between the AD conversion and the comparing process owing to a failure to detect shortcircuit.

As has been described above, with the sensor control circuit according to the invention, it is possible to not only prevent the airbag from being inflated by the runaway processing section, thus preventing blocking the driver's view but also save the airbag otherwise wasted.

I claim:

1. A sensor control circuit comprising:
   a first sensor for detecting an event;
   a second sensor having identical characteristics with those of said first sensor for detecting said event at the same time;
   a processing unit having a first processing section for receiving and processing a first sensor signal from said first sensor and a second processing section for receiving and processing a second sensor signal from said second sensor;
   first switching means for switching in response to a first output from said first processing section;
   second switching means for switching in response to a second output from said second processing section;
   said first and second processing sections being made so as to turn on said first switching means prior to said second switching means in response to said first and second sensor signals; and
   monitor means for preventing current conduction to a load if said second switching means is turned on prior to said first switching means.

2. The sensor control circuit of claim 1, which is connected to an actuator of an airbag device.

3. The sensor control circuit of claim 2, wherein said first and second processing sections integrate said first and second sensor signals from said first and second sensors and determine by comparison whether amplitudes of said sensor signals exceed a first threshold value and a second threshold value, respectively, and output emergency signals for turning on said first and second switching means when said amplitudes are lower than said first and second threshold values, with said first threshold value being set higher than said second threshold value.

4. A sensor control circuit connected to an actuator of an airbag device, comprising:
   a first sensor for detecting an event;
   a second sensor having identical characteristics with those of said first sensor for detecting said event at the same time;
   a processing unit having a first processing section for receiving and processing a first sensor signal from said first sensor and a second processing section for receiving and processing a second sensor signal from said second sensor;
   first switching means for switching in response to a first output from said first processing section;
   second switching means for switching in response to a second output from said second processing section;
   said first and second processing sections being made so as to turn on said first switching means prior to said second switching means in response to said first and second sensor signals;

monitor means for preventing current conduction to a load if said second switching means is turned on prior to said first switching means; and said first switching means consisting of a pnp transistor having a base connected to a first amplifier of the inverse type for receiving an output from said first processing section; and an emitter connected to an energy reservoir consisting of a capacitor of large capacitance;

said second switching means consisting of an npn transistor having a base connected to a second aplifier for receiving an output from said second processing section and an emitter grounded;

said actuator consisting of a heater connected across said collectors of said first and second transistors so that when said first and second transistors are turned on, said heater generates heat, which blows up an explosive, causing a gas producing material to produce gases, which instantly inflate an airbag.

5. The sensor control circuit of claim 4, wherein said monitor means consisting of a comparator for comparing with a standard voltage $V_S$ a controlled voltage $V_T$ applied to a positive terminal of said heater which is not sufficiently high to cause said heater to generate heat and, when $V_T<V_S$, outputs an inhibition signal for turning off said first switching transistor, thereby preventing current conduction to said heater.

6. A sensor control circuit comprising:
a first sensor for detecting an event;
a second sensor having identical characteristics with those of said first sensor for detecting said event at the same time;
a processing unit having a first processing section for receiving and processing a first sensor signal from said first sensor and a second processing section for receiving and processing a second sensor signal from said second sensor;
first switching means for switching in response to a first output from said first processing section;
second switching means for switching in response to a second output from said second processing section;
said first and second processing sections being made so as to turn on said first switching means prior to said second switching means in response to said first and second sensor signals;
a load connected in series with said first and second switching means;
monitor means for comparing a standard voltage $V_S$ with a control voltage $V_T$ applied to a positive terminal of said load and, if said second switching means is turned on prior to said first switching means resulting in $V_T<V_S$, generates an inhibition signal for preventing said first switching means from been turned on thereby preventing current conduction to said load.

7. The sensor control circuit of claim 6, wherein said first switching means comprises a pnp transistor having a base connected to a first inversion type amplifier and an emitter connected to an energy reservoir of a large capacity.

8. The sensor control circuit of claim 7, wherein said second switching means comprises an npn transistor having a base connected to a second amplifier for receiving an output of said second processing section and an emitter grounded.

9. The sensor control circuit of claim 8, wherein said load comprises a heater connected between collectors of said first and second transistors and, when said first and second transistors are turned on, produces heat which ignites an explosive causing a gas generating material to generate gases thereby instantly inflating an airbag.

10. A sensor control circuit for a vehicle airbag control, comprising:
a first sensor for detecting an acceleration of a vehicle;
a second sensor having characteristics identical with those of said first sensor and detecting said acceleration at the same time;
a processing unit including a first processing section for receiving and processing a first sensor signal from said first sensor and a second processing section for receiving and processing a second sensor signal from said second sensor;
first switching means including a pnp transistor having a base connected to a first amplifier of an inverse type for receiving an output from said first processing section and an emitter connected to an energy reservor of a large capacity to response to a first output from said first processing section for performing a switching operation;
second switching means including an npn transistor having a base connected to a second amplifier for receiving an output from said second processing section and an emitter grounded to response to a second output from said second processing section for performing a switching operation;
a heater connected in series between collectors of said first and second switching means so that when both of said first and second transistors are turn on, it generates heat for igniting an explosive to instantly inflate an airbag;
monitor means for preventing current conduction to said load if said second switching means is turned on prior to said first switching means.

* * * * *